United States Patent
He et al.

(10) Patent No.: US 9,042,455 B2
(45) Date of Patent: May 26, 2015

(54) PROPAGATION MAP

(75) Inventors: Shan He, Princeton, NJ (US); Jeffrey Adam Bloom, West Windsor, NJ (US); Dekun Zou, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 474 days.

(21) Appl. No.: 12/737,564

(22) PCT Filed: Aug. 19, 2009

(86) PCT No.: PCT/US2009/004715
§ 371 (c)(1),
(2), (4) Date: Jan. 25, 2011

(87) PCT Pub. No.: WO2010/021700
PCT Pub. Date: Feb. 25, 2010

(65) Prior Publication Data
US 2011/0176610 A1    Jul. 21, 2011

Related U.S. Application Data

(60) Provisional application No. 61/189,370, filed on Aug. 19, 2008.

(51) Int. Cl.
*H04B 1/66* (2006.01)
*F02M 35/10* (2006.01)
(Continued)

(52) U.S. Cl.
CPC ........ *F02M 35/10144* (2013.01); *G06T 1/0028* (2013.01); *G06T 1/0085* (2013.01);
(Continued)

(58) Field of Classification Search
CPC ............... F02M 35/10144; F02M 35/10236; F02M 35/10288; F02M 35/10321; F02M 35/10327; F02M 35/10347; F02M 35/10354; F02M 35/104; G06T 1/0028; G06T 1/0085; G06T 2201/0202; H04N 19/00218; H04N 19/00272; H04N 19/00545; H04N 19/00557; H04N 19/00563; H04N 19/00684
USPC ................................ 382/100, 239, 247, 246; 375/240.01–240.29
See application file for complete search history.

(56) References Cited

U.S. PATENT DOCUMENTS

| 5,867,109 | A | 2/1999 | Wiedeman |
| 6,009,176 | A | 12/1999 | Gennaro et al. |

(Continued)

FOREIGN PATENT DOCUMENTS

| CN | 101218830 | 7/2008 |
| EP | 1515506 | 3/2005 |

(Continued)

OTHER PUBLICATIONS

Profrock et al., "H.264/AVC Video Authentication Using Skipped Macroblocks for an Erasable Watermark", Visual Communications and Image Processing, 2005, SPIE, Bellingham, WA, 2005.

(Continued)

*Primary Examiner* — Behrooz Senfi
(74) *Attorney, Agent, or Firm* — Robert B. Shedd; Ivonete Markman

(57) ABSTRACT

A method comprises receiving original encoded video stream as one input, accessing encoded data divided into slices which are further divided into blocks, receiving the list of possible changes or watermarks as another input, accessing at least one block, decoding each slice, setting down each slice, extracting from the list those changes that apply to the at least one block, and constructing propagation maps from inter-prediction or intra-prediction using changes for the at least one block. The method can further comprise decoding luminance data using the propagation maps, comparing the luminance data to a fidelity threshold, and applying possible changes or watermarks to those not exceeding the fidelity threshold.

40 Claims, 5 Drawing Sheets a b

(51) Int. Cl.

| | |
|---|---|
| *G06T 1/00* | (2006.01) |
| *F02M 35/104* | (2006.01) |
| *H04N 19/159* | (2014.01) |
| *H04N 19/46* | (2014.01) |
| *H04N 19/513* | (2014.01) |
| *H04N 19/174* | (2014.01) |
| *H04N 19/48* | (2014.01) |
| *H04N 19/467* | (2014.01) |
| *H04N 7/32* | (2006.01) |

(52) U.S. Cl.
CPC .. *G06T2201/0202* (2013.01); *F02M 35/10236* (2013.01); *F02M 35/10288* (2013.01); *F02M 35/10321* (2013.01); *F02M 35/10327* (2013.01); *F02M 35/10347* (2013.01); *F02M 35/10354* (2013.01); *F02M 35/104* (2013.01); *H04N 19/159* (2014.11); *H04N 19/46* (2014.11); *H04N 19/513* (2014.11); *H04N 19/174* (2014.11); *H04N 19/48* (2014.11); *H04N 19/467* (2014.11)

(56) References Cited

U.S. PATENT DOCUMENTS

| | | | | |
|---|---|---|---|---|
| 6,064,661 | A | * | 5/2000 | Benn ........................ 370/329 |
| 6,341,350 | B1 | | 1/2002 | Miyahara et al. |
| 6,373,960 | B1 | | 4/2002 | Conover et al. |
| 6,415,041 | B1 | | 7/2002 | Oami et al. |
| 6,553,127 | B1 | | 4/2003 | Kurowski |
| 6,687,384 | B1 | | 2/2004 | Isnardi |
| 6,894,628 | B2 | | 5/2005 | Marpe et al. |
| 6,900,748 | B2 | | 5/2005 | Marpe et al. |
| 7,113,612 | B2 | | 9/2006 | Sugahara et al. |
| 7,159,117 | B2 | | 1/2007 | Tanaka |
| 7,197,164 | B2 | | 3/2007 | Levy |
| 7,286,710 | B2 | | 10/2007 | Marpe et al. |
| 7,646,881 | B2 | | 1/2010 | Zarrabizadeh |
| 7,839,312 | B2 | | 11/2010 | Tanaka et al. |
| 7,865,034 | B2 | | 1/2011 | So |
| 7,974,714 | B2 | | 7/2011 | Hoffberg |
| 8,121,341 | B2 | * | 2/2012 | Tapson et al. ............... 382/100 |
| 8,189,854 | B2 | * | 5/2012 | Watson et al. ............... 382/100 |
| 8,559,501 | B2 | | 10/2013 | Chen et al. |
| 8,571,256 | B2 | | 10/2013 | Tourapis et al. |
| 8,588,459 | B2 | | 11/2013 | Bloom et al. |
| 8,824,727 | B2 | | 9/2014 | Zou et al. |
| 2002/0071593 | A1 | | 6/2002 | Muratani |
| 2002/0097892 | A1 | | 7/2002 | Oami et al. |
| 2002/0136428 | A1 | * | 9/2002 | Sugahara et al. ............ 382/100 |
| 2003/0070075 | A1 | | 4/2003 | Deguillaume et al. |
| 2003/0152225 | A1 | | 8/2003 | Kunisa |
| 2004/0017852 | A1 | * | 1/2004 | Garrido et al. ............ 375/240.16 |
| 2004/0168110 | A1 | | 8/2004 | Fuldseth et al. |
| 2004/0247154 | A1 | | 12/2004 | Bodo et al. |
| 2005/0044411 | A1 | | 2/2005 | Somin et al. |
| 2005/0069169 | A1 | | 3/2005 | Zarrabizadeh |
| 2005/0123207 | A1 | * | 6/2005 | Marpe et al. ............... 382/239 |
| 2005/0207499 | A1 | | 9/2005 | Hwang et al. |
| 2006/0078292 | A1 | | 4/2006 | Huang et al. |
| 2006/0222344 | A1 | | 10/2006 | Ukai et al. |
| 2006/0236130 | A1 | | 10/2006 | Ito et al. |
| 2006/0269096 | A1 | | 11/2006 | Kumar et al. |
| 2007/0053438 | A1 | | 3/2007 | Boyce et al. |
| 2007/0110033 | A1 | | 5/2007 | Tu et al. |
| 2007/0242862 | A1 | * | 10/2007 | Watson et al. ............. 382/124 |
| 2008/0009272 | A1 | | 1/2008 | Toledano |
| 2008/0063071 | A1 | | 3/2008 | Suzuki |
| 2008/0165849 | A1 | | 7/2008 | Moriya et al. |
| 2008/0247469 | A1 | | 10/2008 | Vadapalli et al. |
| 2009/0279603 | A1 | * | 11/2009 | Chen et al. ............... 375/240.02 |
| 2009/0290750 | A1 | | 11/2009 | Tapson et al. |
| 2011/0129116 | A1 | | 6/2011 | Thorwirth |
| 2011/0176610 | A1 | | 7/2011 | He et al. |
| 2011/0222723 | A1 | * | 9/2011 | He et al. ..................... 382/100 |
| 2011/0293016 | A1 | | 12/2011 | Suzuki |
| 2012/0237078 | A1 | | 9/2012 | Watson et al. |
| 2013/0058395 | A1 | | 3/2013 | Nilsson et al. |
| 2013/0058405 | A1 | | 3/2013 | Zhao et al. |
| 2013/0208814 | A1 | | 8/2013 | Argyropoulos et al. |

FOREIGN PATENT DOCUMENTS

| | | |
|---|---|---|
| EP | 1909508 | 4/2008 |
| JP | 11331822 | 11/1999 |
| JP | 11341450 | 12/1999 |
| JP | 11346302 | 12/1999 |
| JP | 2001119557 | 4/2001 |
| JP | 2003125227 | 4/2003 |
| JP | 2003134329 | 5/2003 |
| JP | 2003179740 | 6/2003 |
| JP | 2003244419 | 8/2003 |
| JP | 2003529297 | 9/2003 |
| JP | 2004221715 | 8/2004 |
| JP | 2005533410 | 11/2005 |
| JP | 2006279992 | 10/2006 |
| JP | 2006287364 | 10/2006 |
| JP | 2006303580 | 11/2006 |
| JP | 2007053687 | 3/2007 |
| JP | 2007525074 | 8/2007 |
| WO | 2004066206 | 8/2004 |
| WO | 2007067168 | 6/2007 |
| WO | WO2008065814 | 6/2008 |
| WO | 2008118145 | 10/2008 |
| WO | 2008154041 | 12/2008 |

OTHER PUBLICATIONS

Nguyen et al., "A Fast Watermarking System for H.264/ AVC Video", 2006 IEEE, 2006.
Zou et al., "H.264/AVC Stream Replacement Technique for Video Watermarking", ICASSP 2008, 2008 IEEE, 2008.
Hu, "Information Hiding Based on Intra Prediction Modes for H.264 AVC", Multimedia and Expo, 2007 IEEE, International Conference, IEEE PI, Jul. 1, 2007, pp. 1231-1234.
Seo et al., "Low-Complexity Watermarking Based on Entropy Coding in H.264 AVC," IEICE Trans. Fundamentals, vol. E91-A, No. 8, Aug. 2008.
Noorkami, "Secure and Robust Compressed-Domain Video Watermarking for H.264," A Thesis Presented to the Academic Faculty at Georgia Institute of Technology, 124 pages, Aug. 2007.
Song et al., "A Data Embedded Video Coding Scheme for Error-Prone Channels", IEEE Transactions on Multimedia, vol. 3, No. 4, Dec. 1, 2001. pp. 415-423.
Liu et al., "Data Hiding in Inter and Intra Prediction Modes of h.264/AVC", IEEE Int'l Symposium on Circuits and Systems, 2008 (ISCAS 2008), May 18, 2008, pp. 3025-3028.
Winkler, "Preceptual Quality Assessments for Video Watermarking", Proceedings from the IEEE Conference on Standardizaton and Innovation in Information Technology, Oct. 18, 2002, pages.
Mobasseri et al., "Authentication of H.264 Streams by Direct Watermarking of CAVLC Blocks", Security, Steganography, and Watermarking of Multimedia Contents IX, Proceedings of SPIE—IS&T Electronic Imaging, SPIE, vol. 6505, 65951W, 2007.

* cited by examiner

PROPAGATION MAP

CROSS-REFERENCE

This application claims the benefit, under 35 U.S.C. §365 of International Application PCT/US 2009/004715, filed Aug, 19, 2009 which was published in accordance with PCT Article 21(2) on Feb. 25, 2010 in English and which claims the benefit of U.S. provisional patent application No. 61/189,370 filed Aug, 19, 2008.

FIELD OF THE INVENTION

The present invention relates to a process for generating and using propagation maps in AVC watermarking.

BACKGROUND OF THE INVENTION

A video picture is encoded into one or more non-overlapping slices and each slice contains an integer number of macroblocks. There are five types of coded slices in H.264 (see Table 6.1 of Iain E. G. Richardson, H.264 and MPEG-4 Video Compression: Video Coding for Next-generation Multimedia, John Wiley and Sons, 2003). Further, there are some video processing applications that modify an H.264/AVC encoded video. Digital watermarking is one such application. Unfortunately, the application of digital watermarking can cause objectionable artifacts in display video images. Consequently, a need exists to predict, characterize and prevent objectionable artifacts associated with digital watermarking.

SUMMARY OF THE INVENTION

A method comprises accessing encoded data which can be divided into blocks, accessing a list of possible changes to encoded data, constructing propagation maps of resultant changes to encoded data that will be caused by implementing at least one of the possible changes, and applying one of the possible changes based on the propagation maps. The encoded data can be video data in which the frames are divided into slices which are further divided into blocks, and the changes can represent potential watermarks. The method can further include constructing the propagation maps which reflect propagation due to inter-prediction, wherein resultant changes include a direct block and at least one neighbor block. The inter-prediction can be temporal inter-predicted, wherein resultant changes can include a direct block and at least one neighbor block. The method can further incorporate intra-prediction to construct propagation maps, wherein resultant changes can include a direct block and at least one neighbor block. The resultant propagation maps can then be used, for example, to determine impact on the fidelity that would be caused by the possible changes, thereby providing a means of eliminating possible changes in relation to fidelity thresholds.

BRIEF DESCRIPTION OF THE DRAWINGS

The invention will now be described by way of example with reference to accompanying drawings.

DESCRIPTION OF THE INVENTION

Figure 1:
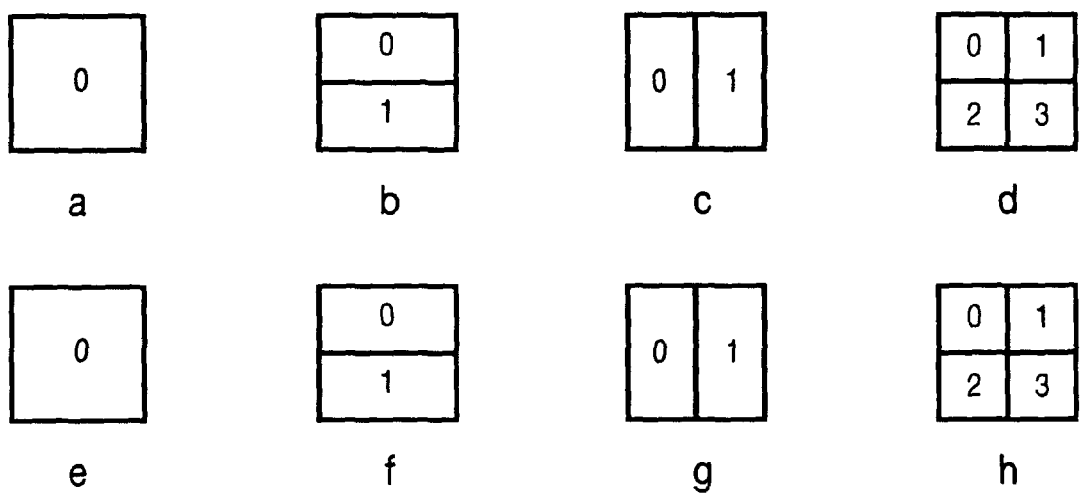
FIG. 1 shows examples of macroblock partitions and sub-macroblock partitions.

Embodiments of the invention will now be described that address the problem of artifact generation associated with the application of digital watermarking where the watermarking process modifies the motion vectors in the compressed stream. These artifacts introduced by motion vector (mv) modifications not only change the reconstructed pixels of the current block, i.e., the block to which the motion vector belongs, but can also cause luminance or chrominance changes in other blocks, because the reconstructed my or the reconstructed pixels of the current block can serve as a reference for other blocks in the motion vector prediction or block prediction. These changes in other blocks can further propagate.

In particular, the invention creates a propagation map that indicates how a single change will propagate through a picture. A representation of a propagation map and an algorithm to build a propagation map to track the affected blocks and their changes is presented in the following text. The invention contemplates the incorporation of the propagation map construction into an H.264 decoder. Such a propagation map is useful in many aspects. The propagation map can be used to (1) examine the visual distortion resulting from a change, (2) examine changes that result in overlapping propagation maps, (3) examine changes that fall in the propagation path of a previous change, (4) identify multiple changes that combine such that a third block is affected, to improve the detection region when these changes are employed for watermarking, and (5) sometimes to avoid changes. A propagate path is how a single change in one block propagates to other blocks.

The invention recognizes that there are some video processing applications that modify an H.264/AVC encoded video such as digital watermarking and that a fidelity change predictor could be a parameter to ensuring that a selected watermarking is not diminishing video quality. The invention further provides a means for characterizing fidelity changes associated with decoding of areas in which the change was directly made, but further capture some changes that can propagate to other areas of the picture. As such, a map according to the invention indicates the areas to which a change will propagate and can apply the fidelity assessment to all of those areas. Furthermore, it is contemplated that in watermarking applications that multiple changes in a slice can be made. With this in mind, the invention was devised to apply to watermarking when there is a need to know what effect a change will have on the decoded imagery in which a given slice could experience a plurality of changes and there is a means for expressing the composite change on the unmarked version of the content. However, if a previous change has already propagated to the current region and another change is made, the resulting decoded imagery can include the effects of both changes. If the first change is known, then the result can be predicted, but possibly without knowledge a priori of whether or not the first change will be employed. If a change can be mapped indicating all of the areas to which a change will propagate, then making other changes inside of that propagation path can be avoided. A combination of these problems can also occur. If a region of a picture is modified indirectly, because a change in a different region has propagated to the current region, then the current region in an assessment of the fidelity impact of that change can be examined or determined. However, it is possible that there are multiple changes, all of which can propagate into the current region. If the propagation paths of all the changes are mapped, these regions of overlapping propagation can be identified and all combinations of impacts can be considered.

The inventions can be utilized in H.264 standard for block change prediction. Inter-prediction macroblocks are coded as the sum of a prediction from a reference frame/picture and a residual. The motion vector defines the block of pixels in the reference frame to be used as the prediction. Additionally, in the H.264 standard, pictures/frames are divided into slices. A slice is a sequence of macroblocks, wherein the macroblocks can be addressed/numbered in raster scan order within a frame. Each macroblock is comprised of one 16×16 luma array and can be divided in one of four ways: one 16×16 macroblock, two 8×16 macroblock partitions, two 16×8 macroblock partitions, or four 8×8 macroblock partitions. If the 8×8 mode is chosen, each of the four 8×8 macroblock partitions can be further divided into one of four sub-macroblock partitions: one 8×8, two 4×8, two 8×4, or four 4×4. The arrays can be associated chroma data also. The macroblock partitions and sub-macroblock partitions are indexed as shown in FIG. 1. In FIG. 1, four example macroblock partitions are shown in examples a-d, wherein example a is 1 macroblock partition of 16×16 luma samples—, example b is 2 macroblock partitions of 16×8 luma samples, example c is 2 macroblock partitions of 8×16 luma samples, and example d is 4 macroblock partitions of 8×8 luma samples. Example e represents 1 sub-macroblock partition of 8×8 luma samples, example f represents 2 sub-macroblock partitions of 8×4 luma samples, example g represents sub-macroblock partitions of 4×8 luma samples, and example h represents 4 sub-macroblock partitions of 4×4 luma samples. As a result, each macroblock partition and sub-macroblock partition can be uniquely referenced by the combination of (frame#, macroblock#, macroblock partition index, (sub-macroblock index)). The associated chroma samples are divided in a similar way and the actual block and sub-block sizes are determined by the video format to be encoded.

Figure 2:
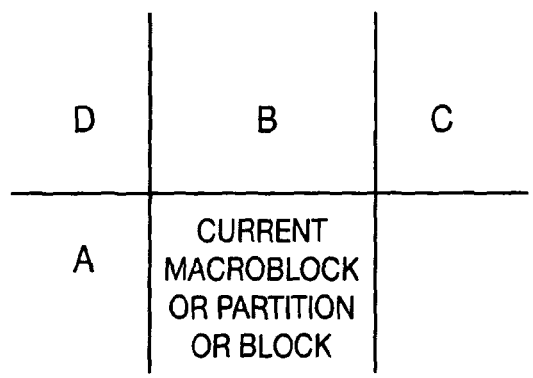
FIG. 2 represents neighboring motion vectors in a frame.
Figure 3:
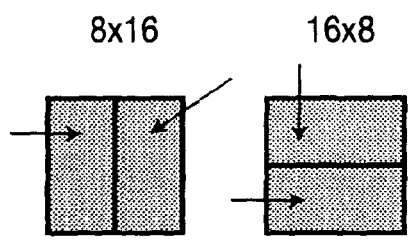
FIG. 3 represents directional segmentation prediction.

The motion vector of a partition (mv) is coded as the sum of a motion vector prediction (MVp) and a motion vector differential (mvd). The prediction is based on the motion vectors of the neighboring partitions in the same frame/picture: A, B, C, and D as shown in FIG. 2. The mv prediction can be performed according to known rules in Section 8.4.1.3 of ITU-T Recommendation H.264|ISO/IEC 14496-10 International Standard with Amendment 1. The rules assume the availability of neighbors A, B, and C and use the corresponding motion vectors, mvA, mvB, and mvC. However, in practice some or all of these blocks can be unavailable. When neighbor A is unavailable, mvA=0 can be assumed. When neighbor B is unavailable, mvB=0 can be assumed. When neighbor C is unavailable, mvC=mvD can be assumed if neighbor D is available, otherwise mvC=0 can be assumed. Rules for generating the prediction MVp can be as follows:

a. For 16×8 partitions, the MVp for the upper 16×8 partition is predicted from neighbor B and the MVp for the lower 16×8 is predicted from neighbor A in FIG. 3.

b. For 8×16 partitions, the MVp for the left 8×16 partition is predicted from neighbor A and the MVp for the right 8×16 partition is predicted from neighbor C in FIG. 3.

c. For transmitted partitions other than 16×8 and 8×16 partition sizes, B-slices can be predicted from one of a number different reference frames stored in a list. Each partition has a reference index indicating which reference frame in the list should be used. If the reference index of the current partition matches one and only one of the reference indices of neighbors A, B, or C, then the motion vector of that neighbor is used as MVp. Otherwise, MVp is set to the median of the motion vectors for neighbor partitions A, B, and C.

i. If there is more than one partition immediately above the current block, then the leftmost is used as neighbor B; if there is more than one immediately to the left to the current block, then the topmost one is used as neighbor A.

ii. If both neighbors B and C are not available and A is available, then rather than taking the median of (0, 0, mvA), which would be 0, set MVp=mvA.

If a block is encoded with direct prediction mode, there will be no motion vector transmitted for the block. Instead, its motion vector will be calculated based on previously decoded blocks. There are two modes of direct prediction: spatial direct mode and temporal direct mode.

In the spatial direct mode, the first reference frame in a list 1 is first considered, which stores a number of different reference frames for one direction prediction in a bi-prediction mode. The co-located block in that frame can be indentified and its motion vectors examined or evaluated. If motion vectors are within the range [−1, 1] and their reference index is 0 (along with some other conditions), it means the motion is stationary and small, and its motion vector is set to 0. Otherwise, the motion is significant, and the motion vector is predicted in the same way as described above in predicting motion vectors from neighbors.

In the temporal direct mode, the motion vector of the current block can be directly derived from the motion vectors of the co-located block in the first reference of list 1. Since this mode does not involve neighbor block motion vectors, it will not be a source of propagation in B slices.

Regarding intra-prediction, intra-predicted macroblocks are coded as the sum of a prediction from within the current frame/picture and a residual. If one or more of the reference blocks are on the propagation map of a change, then the prediction can be affected by that change, in which case the current block would be also on the propagation map. There can be three types of intra-prediction: intra_4×4, intra_8×8, and intra_16×16. In the Intra_4×4 mode, the macroblock is predicted for each of the 16 4×4 blocks. There are a total of 8 modes (per table 8-2 of ITU-T Recommendation H.264 f ISO/IEC 14496-10 International Standard with Amendment 1) involving all 4 of the neighboring blocks, A, B, C, and D shown in FIG. 4. The 8 modes are listed in Table 1 below along with the involved neighboring block(s) (adapted from Table 8-2 of ITU-T Recommendation H.264|ISO/IEC 14496-10 International Standard with Amendment 1). In the table, different from the Table 8-2 of the standard, it is possible to distinguish the three different cases for the Intra_4× 4_DC mode: mode 2—use both A and B; mode 9—use only A; mode 10—use only B. The fourth case of 4×4_DC mode is to use neither A nor B, which does not affect the propagation map and thus can be ignored.

TABLE 1

4×4 Intra-Prediction Modes

| Intra_pred mode (4×4) | Name | Involved Neighbor(s) |
|---|---|---|
| 0 | Intra_4×4_Vertical | B |
| 1 | Intra_4×4_Horizontal | A |
| 2 | Intra_4×4_DC(1) | A, B |
| 3 | Intra_4×4_Diagonal_Down_Left | B, C |
| 4 | Intra_4×4_Diagonal_Down_Right | B, A, D |
| 5 | Intra_4×4_Vertical_Right | B, A, D |
| 6 | Intra_4×4_Horizontal_Down | B, A, D |
| 7 | Intra_4×4_Vertical_Left | B, C |
| 8 | Intra_4×4_Horizontal_Up | A |
| 9 | Intra_4×4_DC(2) | A |
| 10 | Intra_4×4_DC(3) | B |

Figure 4:
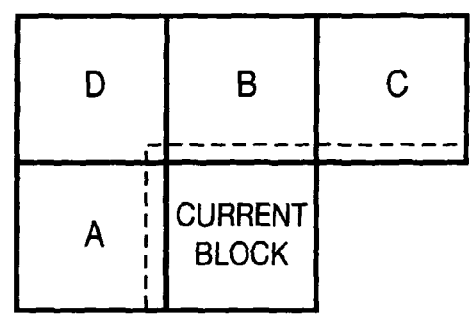
FIG. 4 represents neighbor blocks involved in intra prediction.

In the Intra_8×8 mode, the macroblock is predicted for each of the four 8×8 blocks. There are 8 modes (per table 8-3 of ITU-T Recommendation H.264|ISO/IEC 14496-10 International Standard with Amendment 1) involving all 4 of the neighboring blocks, A, B, C, and D as shown in FIG. 4. The 8 modes are listed in Table 2 below along with the involved neighboring block(s) (adapted from Table 8-3 of ITU-T Recommendation H.264|ISO/IEC 14496-10 International Standard with Amendment 1). Similar to the 4×4 intra-prediction case, it is also possible to distinguish between the three different cases for the Intra_8×8_DC mode. Note that due to a filtering operation before the prediction, the involved neighbors for each mode are different from 4×4 prediction.

TABLE 2

8×8 intra-prediction modes

| Intra_pred mode (8×8) | Name | Involved Neighbor(s) |
|---|---|---|
| 0 | Intra_8×8_Vertical | B, C, D |
| 1 | Intra_8×8_Horizontal | A, D |
| 2 | Intra_8×8_DC(1) | A, B, C, D |
| 3 | Intra_8×8_Diagonal_Down_Left | B, C, D |
| 4 | Intra_8×8_Diagonal_Down_Right | A, B, C, D |
| 5 | Intra_8×8_Vertial_Right | A, B, C, D |
| 6 | Intra_8×8_Horizontal_Down | A, B, C, D |
| 7 | Intra_8×8_Vertical_Left | B, C, D |
| 8 | Intra_8×8_Horizontal_Up | A, D |
| 9 | Intra_8×8_DC(2) | A, D |
| 10 | Intra_8×8_DC(3) | B, C, D |

In the Intra_16×16 mode, the macroblock is predicted as a whole. There are 4 modes (per table 8-4 of ITU-T Recommendation H.264|ISO/IEC 14496-10 International Standard with Amendment 1) involving 3 neighboring blocks, A, B, and D as shown in FIG. 4. Table 3 lists the prediction modes. In order to keep it consistent with the 4×4 and 8×8 predictions, modes 2, 9 and 10 are still used to indicate the three cases of the DC prediction.

TABLE 3

16×16 intra-prediction modes

| Intra_pred mode (16×16) | Name | Involved Neighbor(s) |
|---|---|---|
| 0 | Intra_16×16_Vertical | B |
| 1 | Intra_16×16_Horizontal | A |
| 2 | Intra_16×16_DC(1) | A, B |
| 3 | Intra_16×16_Plane | A, B, D |
| 9 | Intra_16×16_DC(2) | A |
| 10 | Intra_16×16_DC(3) | B |

Specifically, the reference components are neighbor A's rightmost column, neighbor B's last row, neighbor C's last row, and neighbor D's last (lower-right) pixel as shown in FIG. 4. If C is not available, the reference pixels in C are replaced by the rightmost pixel of B's last row with repetition.

In an H.264/AVC watermarking system, a previous step has created a list of potential modifications. Each potential modification consists of a block identifier, an indication of which motion vector can be modified, and the alternative value for that motion vector. Note that, at this point, there can be a number of potential modifications for a single block. In a later step, the list of potential modifications will be pruned so that no block has more than one modification. Each entry in the list represents a change to a motion vector associated with a B-slice inter-predicted macroblock. Changing the motion vector of an inter-predicted block will have the effect of reconstructing the block with a different reference than what was intended during encoding, thus will likely change the decoded pixel values. This change can propagate in 2 ways: (1) if a second block is coded using inter-prediction and predicts its motion vector from the current, then that second block will also use a different reference than what was intended; and (2) if a second block is coded using intra-prediction and predicts its pixel values from the current, then the reconstructed pixels of that second block will be different from what was intended. The first kind of propagation, propagation to a neighboring motion vector, can again propagate to the next set of neighbors in the same way. The second kind of propagation, propagation directly to the pixel values, can only propagate further to neighboring blocks that also use intra-prediction.

In the H.264/AVC watermarking system, the potential changes can be evaluated one at a time. For each entry, one can assume that the potential change is made and then track how that change will propagate to other blocks in the frame/picture. The propagation map is the tool used to represent this information. Later, when assessing the fidelity impact of a potential change, there is only a need to consider the blocks on the propagation path of the potential change, because no other blocks will be affected. Similarly, it is possible to quickly determine if a potential change is in the propagation path of any previously selected change or if the propagation map of a potential change overlaps with that of any previously selected change.

Figure 5:
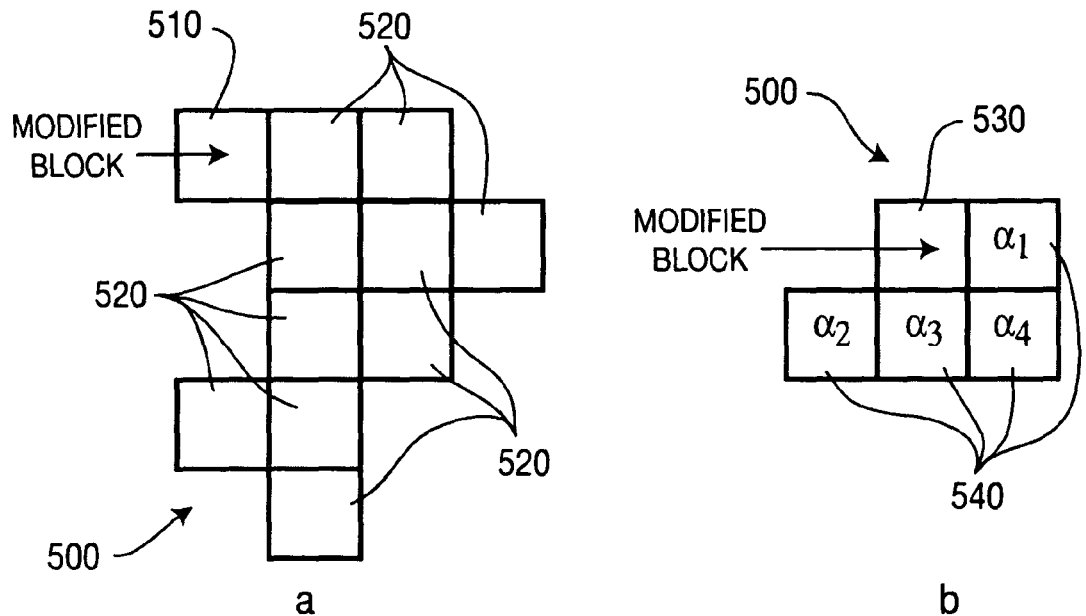
FIG. 5 is an illustration of a propagation map.

FIG. 5(a) illustrates one example of a propagation map. This propagation map 500 is associated with one B-slice block 510 whose motion vector has been directly changed. The other blocks 520 in the figure are blocks that will be indirectly changed due to propagation. When a block changes, either due to a direct modification or because it falls in the propagation path of another change, this change has the potential to further propagate to its neighbors. FIG. 5(b) illustrates another example of a propagation map wherein the four neighbors 540 whose luminance values can be modified due to this propagation, when only one block 530 was directly changed. The propagation map, P, of a changed block represents a collection of the blocks, p, whose luminance values are also changed due to propagation. Each block in the propagation map is represented with a data structure indicating the initial change, the prediction mode of the current block, and change in the current block and is denoted as:

p={head_node_info, mode, cur_node_info}.

The "head_node" uniquely identifies the changed block in terms of position and an alternative value of the motion vector that initiated the changes. All of the nodes in the propagation map P will have the same "head_node." The element "mode" indicates the prediction mode of the current block, which can be either intra-prediction or inter-prediction. The element "cur_node" records the information about the current block. It contains the original and new motion vectors for inter-predicted blocks, and intra-prediction mode and reference blocks for intra-prediction blocks.

Figure 6:
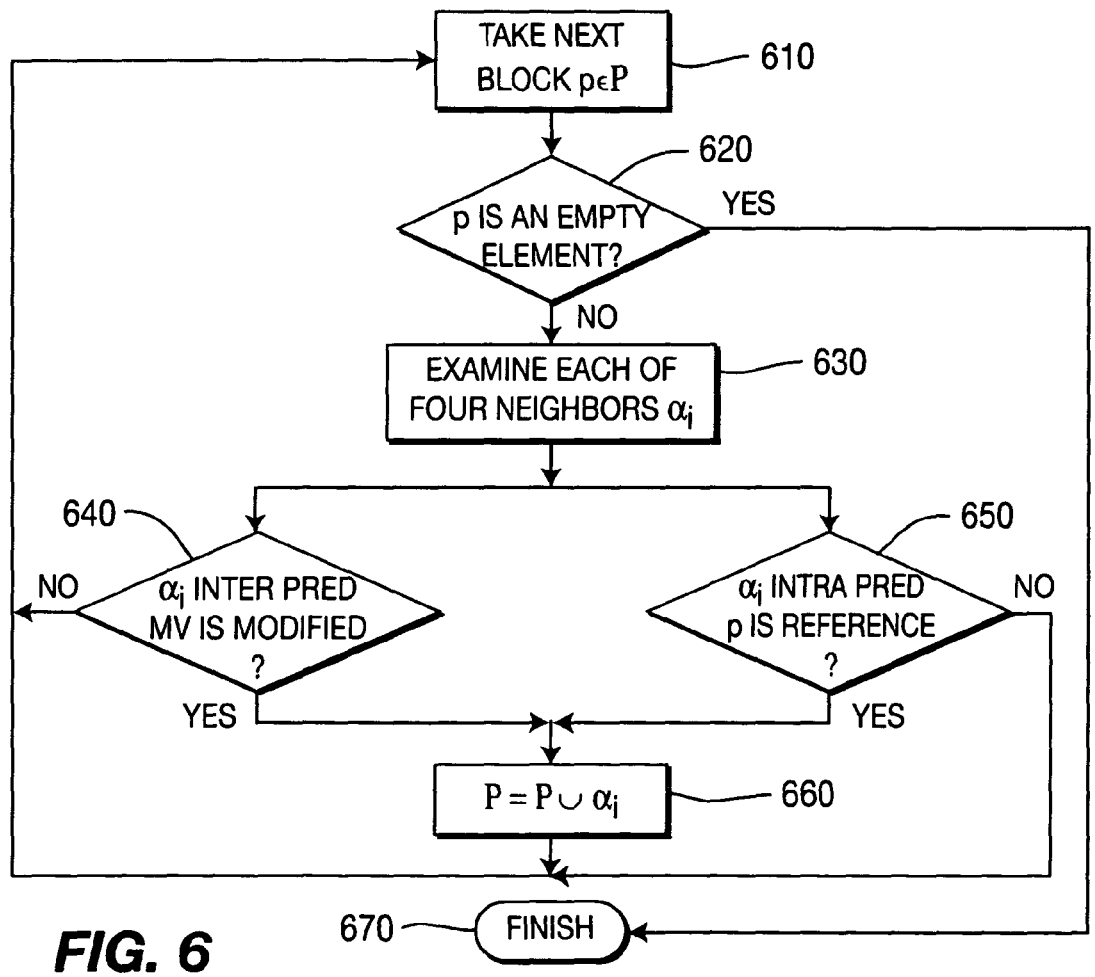
FIG. 6 is a block diagram illustrating the construction of a propagation map.

FIG. 6 shows a method for constructing the propagation map. The propagation map, P, is initialized with the changed block, p, in 610. At evaluation box 620, a determination is made to evaluate whether block p is empty. If block p is not empty, each of its four neighbors $\alpha_i$, i=1, . . . , 4 (as defined in FIG. 5b) is examined in box 630. The goal of each of these examinations is to determine if the change to block p will propagate to neighbor $\alpha_i$. To do this, a processor or the like can compare the decoding using the original values associated with p as well as the changed values. If block $\alpha_i$ is an inter-predicted block, then in the inter-prediction pathway 640, the motion vector predicted using the new motion vector of p and those of the other neighbor blocks can be examined or determined. If it is different from the original motion vector, then the change will propagate to this neighbor and block $\alpha_i$ is appended to the propagation map P in propagation box 660. If $\alpha_i$ is intra-predicted in the intra-prediction pathway 650 and block p is used as the reference in the prediction, then the change will propagate to this neighbor and block $\alpha_i$ is appended to the propagation map P in the propagation box 660. After all the four neighbors have been examined, the next element in P is considered. This process repeats until there are no new elements in P to arrive at finish box 670.

The integration of propagation map construction into an H.264 decoder will now be described. This integration is presented in the context of an H.264/AVC watermarking system similarly as described before.

Figure 7:
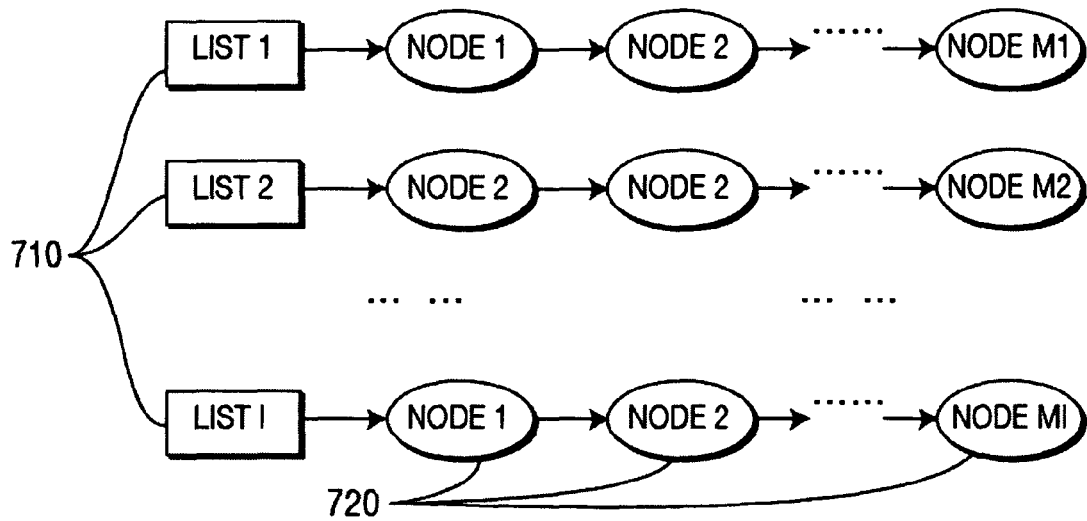
FIG. 7 an illustration of the linked list for the algorithm.

The propagation map P is represented as a linked list, which, as a whole, will identify the macroblocks/partitions affected by the potential modification. As the decoder processes the macroblocks of the B slice in raster scan order, adding affected macroblocks/partitions to the corresponding linked lists can be continued. The detailed integrated algorithm will be described with reference to FIG. 7 illustrating the linked list.

Given a list of potential modifications in a B-slice, containing l entries, each corresponding to a modifiable motion vector with one alternative, l linked lists (710) can be constructed and each list can be initialized to contain at least one node (720), which can be the potential modification itself. The data structure of the node p is shown in Table 4, which contains the location information of the macroblock/partition, original and new motion vector information. Since the process of building propagation map is built into the AVC decoder, most of this information can be directly obtained from the decoder. Other information can be added based on the application of the propagation map.

TABLE 4

Data structure of the linked list for each propagation map

```
struct propagation map_node
{
    next;           // pointer to next node
    /* macroblock/partition information of current block*/
    mbAddr;         // the address of the macroblock w.r.t. the beginning of the frame measured
                    // in the raster scan order
    mbPartIdx;      // the partition index
    subMbPartIdx;   // the sub-macroblock partition index
    /* motion related information corresponding to the modified motion vector */
    MVorg_x;        // x component of the original motion vector of the current block.
    MVorg_y;        // y component of the original motion vector of the current block.
    MVnew_x;        // x component of the modified motion vector of the current block.
    MVnew_y;        // y component of the modified motion vector of the current block.
    refFrmNum;      // the frame number of the reference frame used for motion compensation
    list_id;        // 0 or 1, indicate the list whose motion vector has been modified.
    ref_idx;        // the index of reference frame in list list_id
    MVWeight;       // the weight of the motion-compensated prediction
    /* intra-predicted block */
    Intra-prediction mode;   // −1 for inter prediction, >= 0 for intra prediction (see Table 1- Table 3)
    Involved neighbors;      // record the neighbor blocks involved in the prediction for further analysis
    /* other information */
    . . .
}
```

Figure 8:
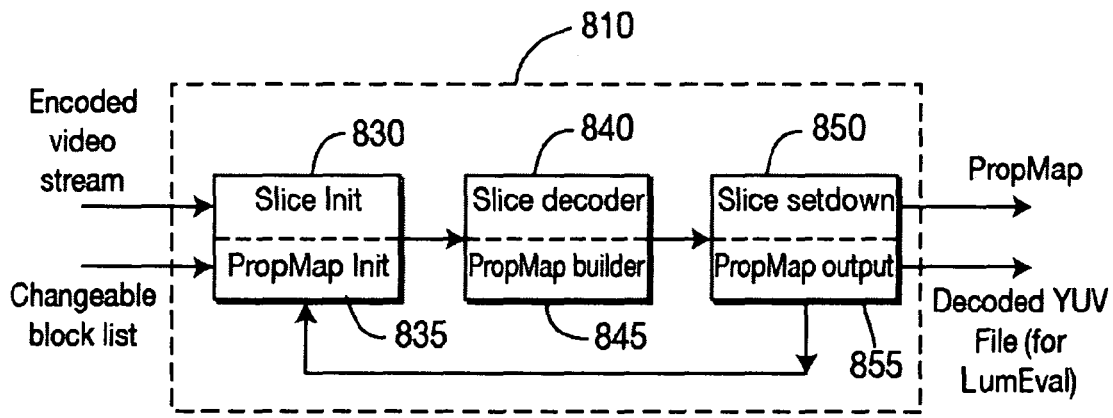
FIG. 8 illustrates an AVC decoder based propagation map construction.

FIG. 8 shows an overview of AVC decoder-based propagation map construction in a decoder 810. Note that the motion vector prediction and intra prediction are performed within one slice. Thus the propagation of one motion vector change cannot propagate outside of the current slice. Therefore, the propagation map can be constructed slice-by-slice. The standard H.264/AVC decoder loops through the three steps: (1) slice initialization 830, (2) slice decoder 840, and (3) slice setdown 850 for each slice in the image sequence. The propagation map construction takes place in this context of processing one slice at a time.

Propagation map construction takes the original encoded video stream as one input. The other input is the list of all potential modifications. The process can be described as a series of three steps in FIG. 8: (1) propagation map initialization 835, propagation map builder 845, and (3) propagation map output 855, in which finalized outputs are used to decode YUV for luminance evaluation. A process of evaluating changes caused by modifying a motion vector value during watermark embedding is herein referred to as LumEval. LumEval measures the amount of luminance change for each block, which can be used to evaluate the changes, such as fidelity assessment in a watermarking application.

Figure 9:
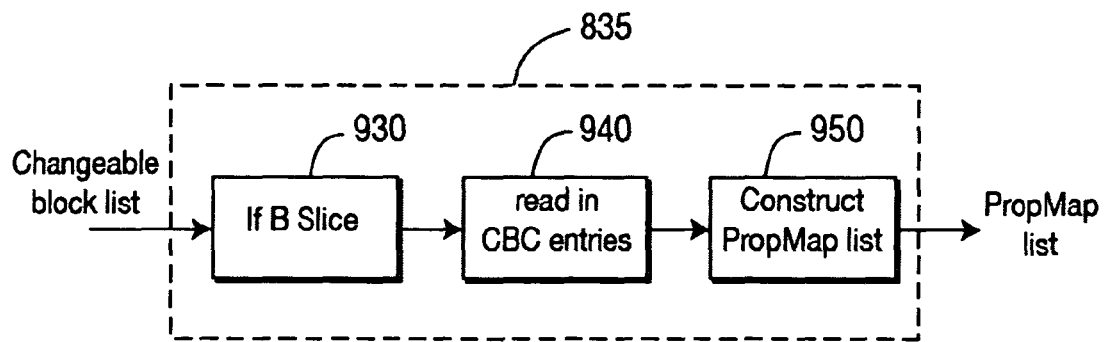
FIG. 9 illustrates a propagation map initialization.

Propagation map initialization 835 is illustrated in FIG. 9 and is integrated into the H.264/AVC decoder's slice initialization process 830. This initialization extracts from the list of potential modifications those that apply to blocks in the current B-slice in box 930. It then reads in changeable block collection entries in box 940 and builds one propagation map for each potential modification in box 950.

Figure 10:
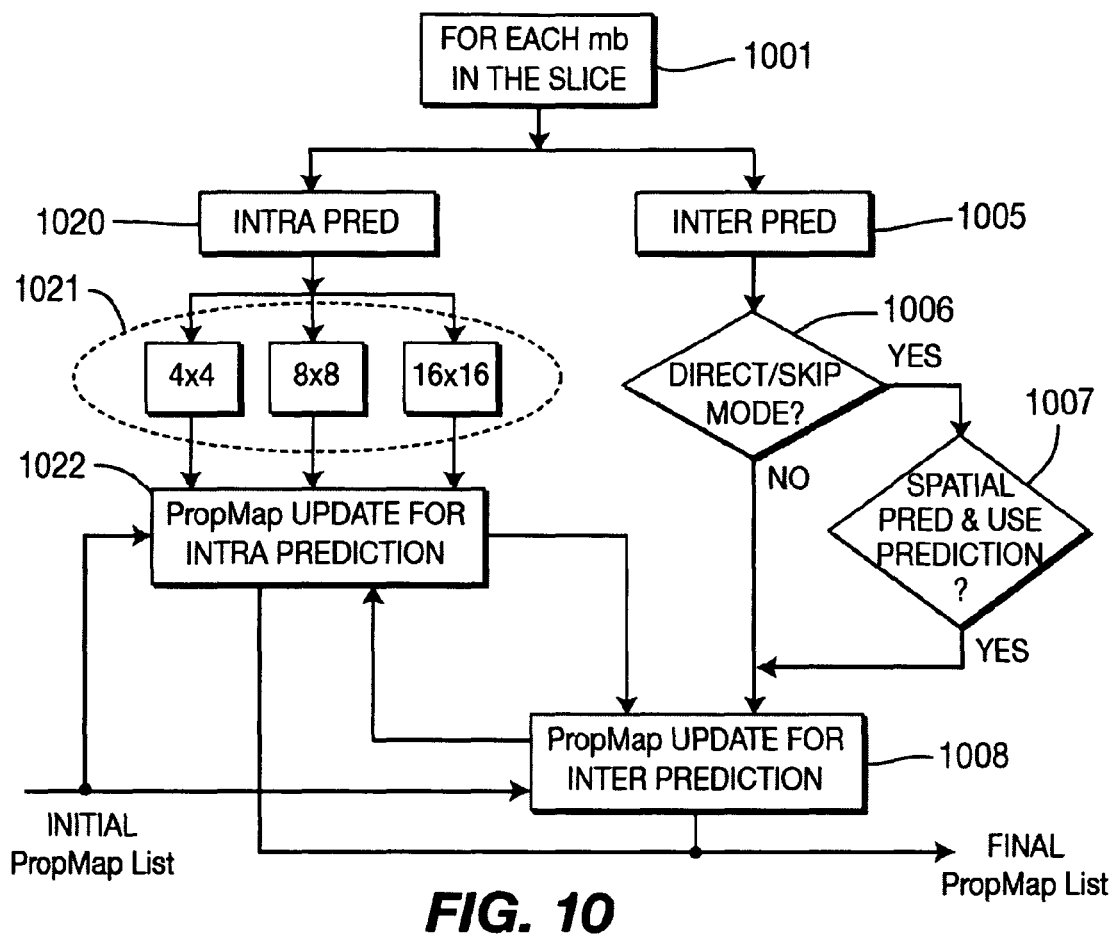
FIG. 10 illustrates steps for producing a final propagation map list.

A propagation map builder in FIG. 10, which is integrated into the slice decoder 840, adds blocks to the propagation maps of potential modifications as the decoder processes each macroblock. Each macroblock considered in a slice is represented by box 1001. When decoding one block, a determination as to which of a number of different coding cases has been used. The cases are inter-prediction, inter-prediction with spatial direct mode, and intra-prediction in box 1020 for the different intra-prediction types 1021. FIG. 10 shows an inter-prediction path 1005 in which a determination is made in direct/skip decision box 1006 as to whether blocks are inter-predicted in direct mode. If the inter-predicted blocks are not inter-predicted in direct mode, then the propagation map is updated according to a propagation update process 1008. Further, if the inter-predicted blocks are not spatially predicted in determination box 1007, then the inter-predicted blocks will not be affected by changes to the neighboring blocks and will not be part of any propagation map. All others are examined to determine if they will be affected by previous changes. Inter-predicted blocks that do not use direct mode as shown in direct/skip decision box 1006 are examined by the propagation update process 1008 and this process is described in FIG. 11.

Figure 11:
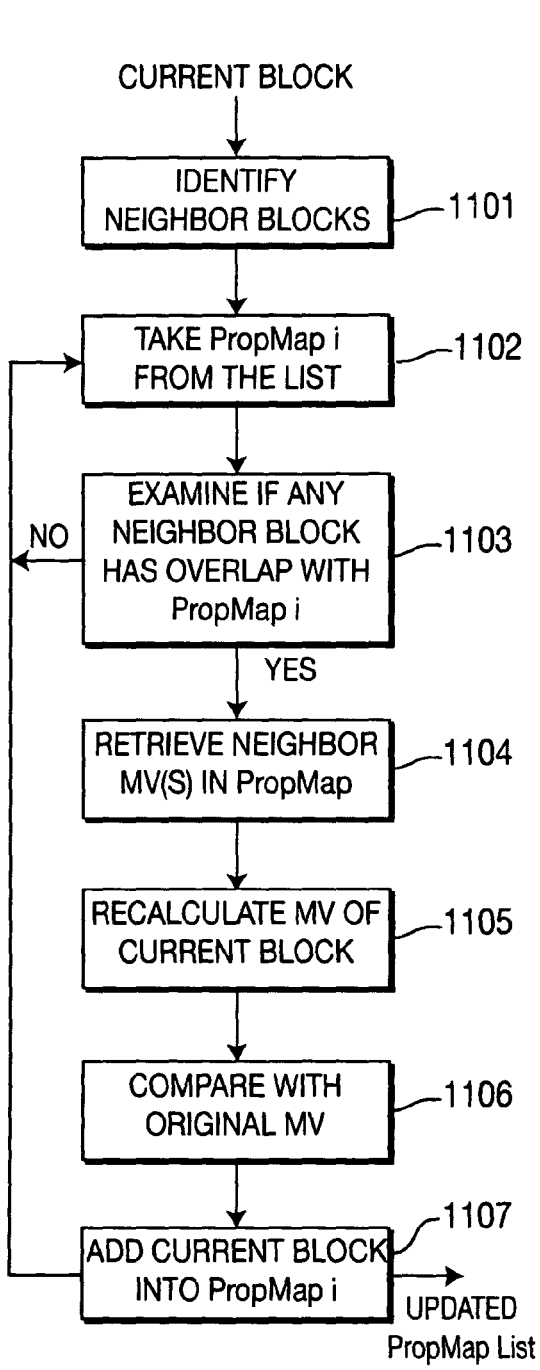
FIG. 11 illustrates a propagation update process.

In FIG. 11, the neighboring blocks are first identified in box 1101. This identification is based on the motion vector predictions MVp as described earlier and the availability of the neighbors as shown in FIG. 2. Of importance and concern here are neighbors that can affect the determination of the current MVp and such neighbors are referred to as identified neighbors. Sampling 1102 through all the propagation map lists and examining neighbor box 1103 determine which of these identified neighbor blocks are in any of the propagation maps. If an identified neighbor falls in a propagation map, this implies that that neighbor has been affected by the potential modification at the head of that map. That change therefore has the potential to propagate to the current block. If no neighbors fall in a propagation map in box 1103, the next map is sampled in box 1102. For each instance of an identified neighbor falling in an existing propagation map, a retrieval 1104 of the motion vectors stored in the propagation map list is performed. With the modified neighbor motion vectors, a recalculation 1105 of the current block is performed. This motion vector prediction for the current block is compared with the original motion vector in box 1106. If they are different, then the change at the head of the propagation map will affect the current block and the current block is added to the corresponding propagation map in box 1107.

Figure 12:
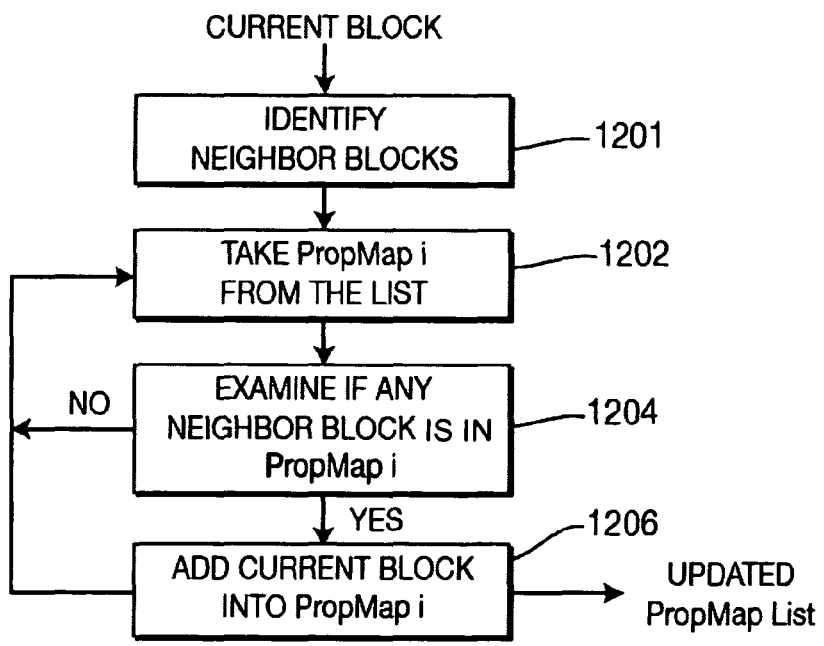
FIG. 12 illustrates a propagation map update for intra prediction.

For updating a propagation map according to only intra-prediction, all intra-prediction blocks with any of the three modes/types 1021 (i.e. 4×4, 8×8 or 16×16) are examined by the propagation map update process 1022 described in FIG. 12. Similar to the examination of inter-predicted blocks, first, an identification of the neighbor blocks of current block is made. This identification is based on the intra-prediction mode as described above. Here, the concern is with neighbors that can affect the pixel prediction of the current partition and such neighbors are referred to as identified neighbors in box 1201. Every propagation map in the list is sampled in box 1202 and examined in box 1204. If any identified neighbor block overlaps with a propagation map, the current node is added to that propagation map in box 1206.

The final step shown in FIG. 8 is slice setdown 850. This can be a standard step of an AVC decoder 810 once the slice has been decoded. The final step of propagation map construction is the output of the propagation map. This step is integrated into the slice setdown 850. An optional decoded yuv file containing pixel values can also be output for further analysis.

It is important to note that in the above algorithm that one can envision a need to go through all the nodes of the 1 propagation maps for every macroblock partition. This can incur a high computational cost. To speed up the process, an improved algorithm is formulated based on two observations. The first is that the parents of the current partition (identified neighbors) can only reside within the same row of macroblocks or the row above; as such, the nodes of list i which are more than one row away from the current block can be excluded during a parent search. The second is that if list i has not been updated for an entire row of macroblocks, the effect of modification on changeable block will not be able to propagate to the remaining blocks in the slice. Thus, the propagation map i is complete and there is no need to check it for future blocks within the current slice. The modified algorithm is presented in FIG. 13, which reflects the propagation update processes 1008 and 1022.

Figure 13:
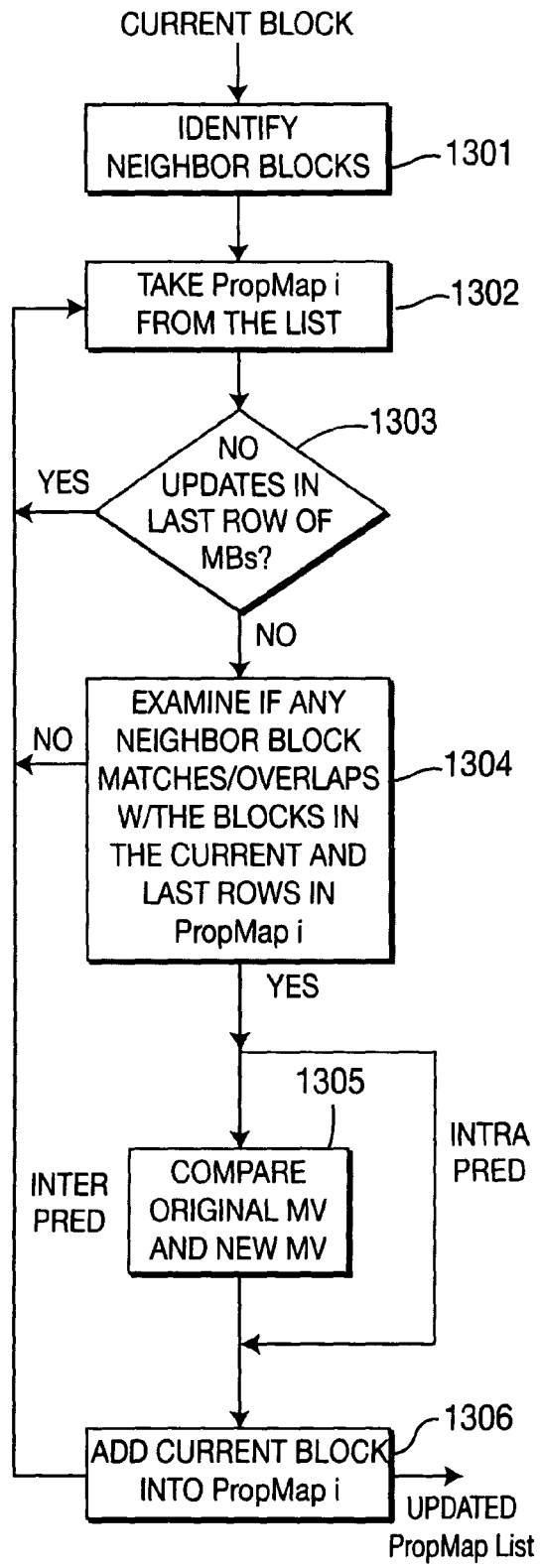
FIG. 13 illustrates an optimized propagation map update for inter/intra prediction.

For updating a propagation map according to intra-prediction and inter-prediction, FIG. 13 begins with first identifying neighbors in box 1301 that can affect the pixel prediction of the current partition. Such neighbors are referred to as identified neighbors. Propagation maps in the list are then sampled in box 1302. If there are no updates in the last row of macroblock in the decision box 1303, the next propagation map is sampled. If there is an update, then an examination is performed in box 1304. If any identified neighbor block overlaps or matches with blocks in the current and last rows in the currently sampled propagation map i, the process is advanced to a comparison step in box 1305. If the original motion vector and a modified motion vector differ, then the current node with the modified motion vector is added to the propagation map in box 1306 along with the updates from the intra-prediction.

Several of the implementations and features described in this application can be used in the context of the H.264/MPEG-4 AVC (AVC) standard. However, these implementations and features can be used in the context of another standard (existing or future), or in a context that does not involve a standard. However, features and aspects of described implementations can also be adapted for other implementations.

The implementations described herein can be implemented in, for example, a method or process, an apparatus, a software program, a datastream, or a signal. Even if only discussed in the context of a single form of implementation (for example, discussed only as a method), the implementation or features discussed can also be implemented in other forms (for example, an apparatus or program). An apparatus can be implemented in, for example, appropriate hardware, software, and firmware. The methods can be implemented in, for example, an apparatus such as a computer or other processing device. Additionally, the methods can be implemented by instructions being performed by a processing device or other apparatus, and such instructions can be stored on a computer readable medium such as a CD, or other computer readable storage device, or an integrated circuit. Further, a computer readable medium can store the data values produced by an implementation.

As should be evident to one of skill in the art, implementations can also produce a signal formatted to carry information that can be, for example, stored or transmitted. The information can include, for example, instructions for performing a method, or data produced by one of the described implementations. For example, a signal can be formatted to carry a watermarked stream, an unwatermarked stream, or watermarking information.

Additionally, many embodiments can be implemented in one or more of an encoder, a decoder, a post-processor processing output from a decoder, or a pre-processor providing input to an encoder. Further, other implementations are contemplated by this disclosure. For example, additional implementations can be created by combining, deleting, modifying, or supplementing various features of the disclosed implementations.

The invention claimed is:

1. A method of video watermarking based on
propagation maps performed by an apparatus comprising:
accessing a list of video watermarks to encoded video data said encoded video data being divided into slices and blocks;
constructing propagation maps of at least one of the video watermarks, wherein a propagation map is a map that represents how a change associated with a video watermark will propagate to other blocks in a frame or picture; and
applying one of the video watermarks based on the propagation maps.

2. The method of claim 1 further comprising:
determining, responsive to the propagation maps, an extent to any visible distortion caused by one of the video watermarks; and
eliminating the one of the video watermark based on the extent of visible distortion.

3. The method of claim 1 further comprising the steps of:
determining, responsive to the propagation maps, an extent to which one of the video watermarks can fall in a propagation path of a previous change; and
eliminating the one of the video watermarks based on the extent of overlap of the paths.

4. The method of claim 1 further comprising:
determining, responsive to the propagation maps, a region for detection for each one of the video watermarks; and
selecting one of the video watermarks based on the detection region.

5. The method of claim 1 further comprising the steps of:
determining, responsive to the propagation maps, an impact on fidelity of a video watermark; and
eliminating the video watermark based on a threshold of fidelity.

6. The method of claim 5 further comprising the steps of:
selecting some of the slices within the encoded video;
identifying motion vector changes associated with selected slices; and
further constructing the propagation maps based on the motion vectors.

7. The method of claim 4 further comprising:
employing the propagation maps in a video decoder.

8. The method of claim 1 wherein the method further comprises the steps of:
determining based on the propagation maps an extent to which propagation paths of a first video watermark overlaps with that of a second video watermark, and
eliminating the first or the second video watermark from the list.

9. A method of constructing a propagation map of a video watermark performed by an apparatus comprising:
accessing or generating a list of video watermarks to encoded video data;
initializing a propagation map (P) of modifications to the data that would be caused on applying a first possible watermark, the propagation map being a collection of different partitions (p) of the data modified by the watermark;
determining on a partition by partition basis whether an individual partition is empty, empty being no change to the individual partition;
determining whether neighbor partition ($\alpha$) of the individual partition are modified, if the individual partition is not empty;
adding an individual neighbor partition ($\alpha_i$) to the propagation map (P), if the individual neighbor partition ($\alpha_i$) is modified; and
updating the propagation map by adding the individual neighbor partitions that are modified until next individual partitions are empty.

10. The method of claim 9 comprising:
determining whether the individual neighbor partition ($\alpha_i$) is modified based on motion vector differentials of the individual partition and its neighbors.

11. The method of claim 9 comprising:
determining whether the individual neighbor partition ($\alpha_i$) is modified based on motion vector information of the individual partition and its neighbors.

12. The method of claim 9 comprising:
determining whether the individual neighbor partition ($\alpha_i$) is modified based on intra-prediction using the individual partition (p) as a reference.

13. A method of constructing a propagation map of a video watermark performed by an apparatus comprising:
accessing partitions or portions of a slice of encoded video data, portion by portion or partition by partition;
determining a means used to code a first portion or partition;
initializing a propagation map of modifications to the data that would be caused on applying a possible watermark to the data, the propagation map being a collection of different portions or partitions (p) of the data modified by the watermark;
determining for inter-predicted portions or partitions if specific coding was direct coding;
determining for direct coded inter-predicted portions or partitions if a spatial prediction mode was used;
comparing non-direct inter-predicted portions or partition to a first corresponding portion or partition in the initialize propagation map and updating the propagation map based on the comparison of the non-direct inter-predicted portion or partitions;
comparing direct spatially inter-predicted portion or partitions to the first corresponding portion or partition in the initialized propagation map and updating the propagation map based on the comparison of the direct spatially inter-directed portions or partitions;
determining for intra-predicted portion or partitions a coding mode; and
comparing the intra-predicted portion or partitions to a second corresponding portion or partition that corresponds to the coding mode and updating the propagation map based on the comparison of the intra-predicted portion or partitions.

14. A method of claim 13 wherein the step of comparing non-direct inter-predicted portions or partitions further comprises:
accessing a current portion or partition of said data;
identifying neighboring portions or partitions;
determining if neighboring portions or partitions are included in the initialized propagation map;

determining motion vectors of the neighboring portions or partitions included in the initialized propagation map;

determining a new motion vector of the current portion or partition based on the motion vector of the neighbors and the original motion vector of the current portion or partition;

comparing the new motion vector to the original motion vector; and adding the current portion or partition to the propagation map if the new and original motion vector are different.

15. A method of constructing a propagation map of a video watermark performed by an apparatus comprising:

accessing a current block or partition of encoded video data;

identifying neighboring blocks or partitions;

initializing or accessing a propagation map (i) of modifications to the data that would be caused on applying a possible watermark to the data, the propagation map being a collection of different blocks or partitions of the data modified by the watermark;

determining if neighbor blocks or partitions are included in the initialized propagation map;

determining motion vectors of the neighbor blocks or partitions included in the initialized propagation map;

determining a new motion vector of the current block based on the motion vector of the neighbors and the original motion vector of the current block or partition;

comparing the new motion vector to the original motion vector; and adding the current block to the propagation map if the new and original motion vectors are different.

16. The method of claim 1 wherein the method further comprises the steps of:

determining based on the propagation maps an extent to which propagation paths associated with a plurality of video watermarks combine to affect additional blocks not present in the propagation paths of each video watermark independently; and eliminating at least one of the plurality of video watermarks from the list.

17. The method of claim 1, wherein constructing a propagation map of a video watermark comprises:

setting the block associated with said video watermark as a first block;

examining neighbor blocks of said first block;
determining if a neighbor block is an inter-predicted block, wherein a motion vector of said inter-predicted block is predicted from the motion vector of said first block; and adding said neighbor block to the propagation map of said video watermark if it is an inter-predicted block and if the motion vector of said inter-predicted block changes as a result of the application of the video watermark on said first block.

18. The method of claim 17, further comprising:
setting said inter-predicted block as the first block; and
repeating the steps of examining, determining and adding in claim 22.

19. The method of claim 1, wherein constructing a propagation map of a video watermark comprises:

examining neighbor blocks of a first block associated with a video watermark;

determining if a neighbor block is an intra-predicted block, wherein an intra-predicted block is one which uses the first block as an intra-prediction reference; and adding said neighbor block to the propagation map of said video watermark if said neighbor block is an inter-predicted block.

20. The method of claim 19, further comprising:
setting said intra-predicted block as the first block; and
repeating the steps of examining, determining and adding in claim 19.

21. An apparatus for video watermarking based on propagation maps comprising a processor, said processor being configured to:

access a list of video watermarks to encoded video data said encoded video data being divided into slices and blocks;

construct propagation maps of at least one of the video watermarks, wherein a propagation map is a map that represents how a change associated with a video watermark will propagate to other blocks in a frame or picture; and apply one of the video watermarks based on the propagation maps.

22. The apparatus of claim 21, wherein the processor is further configured to:

determine, responsive to the propagation maps, an extent to any visible distortion caused by one of the video watermarks; and eliminate the one of the video watermark based on the extent of visible distortion.

23. The apparatus of claim 21, wherein the processor is further configured to:

determine, responsive to the propagation maps, an extent to which one of the video watermarks can fall in a propagation path of a previous change; and eliminate the one of the video watermarks based on the extent of overlap of the paths.

24. The apparatus of claim 21, wherein the processor is further configured to:

determine, responsive to the propagation maps, a region for detection for each one of the video watermarks; and select one of the video watermarks based on the detection region.

25. The apparatus of claim 21, wherein the processor is further configured to:

determine, responsive to the propagation maps, an impact on fidelity of a video watermark; and eliminate the video watermark based on a threshold of fidelity.

26. The apparatus of claim 25 further comprising the steps of:

selecting some of the slices within the encoded video;
identifying motion vector changes associated with selected slices; and further constructing the propagation maps based on the motion vectors.

27. The apparatus of claim 24, wherein the processor is further configured to:

employ the propagation maps in a video decoder.

28. The apparatus of claim 21, wherein the processor is further configured to:

determine based on the propagation maps an extent to which propagation paths of a first video watermark overlaps with that of a second video watermark, and eliminate the first or the second video watermark from the list.

29. An apparatus for constructing a propagation map of a video watermark, said apparatus comprising a processor, said processor being configured to:

access or generate a list of video watermarks to encoded video data;

initialize a propagation map (P) of modifications to the data that would be caused on applying a first possible watermark, the propagation map being a collection of different partitions (p) of the data modified by the watermark;

determine on a partition by partition basis whether an individual partition is empty, empty being no change to the individual partition;

determine whether neighbor partition (a) of the individual partition are modified, if the individual partition is not empty;

add an individual neighbor partition ($\alpha_i$) to the propagation map (P), if the individual neighbor partition ($\alpha_i$) is modified; and update the propagation map by adding the individual neighbor partitions that are modified until next individual partitions are empty.

30. The apparatus of claim 29, wherein the processor is further configured to:
determine whether the individual neighbor partition ($\alpha_i$) is modified based on motion vector differentials of the individual partition and its neighbors.

31. The apparatus of claim 29, wherein the processor is further configured to:
determine whether the individual neighbor partition ($\alpha_i$) is modified based on motion vector information of the individual partition and its neighbors.

32. The apparatus of claim 29, wherein the processor is further configured to:
determine whether the individual neighbor partition ($\alpha_i$) is modified based on intra-prediction using the individual partition (p) as a reference.

33. An apparatus for constructing a propagation map of a video watermark, said apparatus comprising a processor, said processor being configured to:
access partitions or portions of a slice of encoded video data, portion by portion or partition by partition;
determine a means used to code a first portion or partition;
initialize a propagation map of modifications to the data that would be caused on applying a possible watermark to the data, the propagation map being a collection of different portions or partitions (p) of the data modified by the watermark;
determine for inter-predicted portions or partitions if specific coding was direct coding;
determine for direct coded inter-predicted portions or partitions if a spatial prediction mode was used;
compare non-direct inter-predicted portions or partitions to a first corresponding portion or partition in the initialize propagation map and updating the propagation map based on the comparison of the non-direct inter-predicted portion or partitions;
compare direct spatially inter-predicted portion or partitions to the first corresponding portion or partition in the initialized propagation map and updating the propagation map based on the comparison of the direct spatially inter-predicted portion or partitions;
determine for intra-predicted portion or partitions a coding mode; and
compare intra-predicted portion or partitions to a second corresponding portion or partition that corresponds to the coding mode and updating the propagation map based on the comparison of the intra-predicted portion or partitions.

34. The apparatus of claim 33, wherein the processor is configured to compare non-direct inter-predicted portions or partitions by being further configured to:
access a current portion or partition of said data;
identify neighboring portions or partitions;
determine if neighboring portions or partitions are included in the initialized propagation map;
determine motion vectors of the neighboring portions or partitions included in the initialized propagation map;
determine a new motion vector of the current portion or partition based on the motion vector of the neighbors and the original motion vector of the current portion or partition;
compare the new motion vector to the original motion vector; and adding the current portion or partition to the propagation map if the new and original motion vector are different.

35. An apparatus for constructing a propagation map of a video watermark, said apparatus comprising a processor, said processor being configured to:
access a current block or partition of encoded video data;
identify neighboring blocks or partitions;
initialize or accessing a propagation map (i) of modifications to the data that would be caused on applying a possible watermark to the data, the propagation map being a collection of different blocks or partitions of the data modified by the watermark;
determine if neighbor blocks or partitions are included in the initialized propagation map;
determine motion vectors of the neighbor blocks or partitions included in the initialized propagation map;
determine a new motion vector of the current block based on the motion vector of the neighbors and the original motion vector of the current block or partition;
compare the new motion vector to the original motion vector; and
add the current block to the propagation map if the new and original motion vectors are different.

36. The apparatus of claim 21, wherein the processor is further configured to:
determine based on the propagation maps an extent to which propagation paths associated with a plurality of video watermarks combine to affect additional blocks not present in the propagation paths of each video watermark independently; and
eliminate at least one of the plurality of video watermarks from the list.

37. The apparatus of claim 21, wherein the processor is configured to construct a propagation map of a video watermark by being further configured to:
set the block associated with said video watermark as a first block;
examine neighbor blocks of said first block;
determine if a neighbor block is an inter-predicted block, wherein a motion vector of said inter-predicted block is predicted from the motion vector of said first block; and
add said neighbor block to the propagation map of said video watermark if it is an inter-predicted block and if the motion vector of said inter-predicted block changes as a result of the application of the video watermark on said first block.

38. The apparatus of claim 37, wherein the processor is further configured to:
set said inter-predicted block as the first block; and
repeat the steps of examine, determine and add in claim 37.

39. The apparatus of claim 21, wherein the processor is configured to construct a propagation map of a video watermark by being further configured to:
- examine neighbor blocks of a first block associated with a video watermark;
- determine if a neighbor block is an intra-predicted block, wherein an intra-predicted block is one which uses the first block as an intra-prediction reference; and
- add said neighbor block to the propagation map of said video watermark if said neighbor block is an inter-predicted block.

40. The apparatus of claim 39, wherein the processor is further configured to:
- set said intra-predicted block as the first block; and
- repeat the steps of examine, determine and add in claim 39.

* * * * *